MAGNETIC MARKING MEANS FOR RECORDING MEDIA OF BUSINESS MACHINES

Filed April 30, 1957

Inventor:
Heinz Schmidt
By Leon M. Strauss
Att.

2,971,809
Patented Feb. 14, 1961

2,971,809

MAGNETIC MARKING MEANS FOR RECORDING MEDIA OF BUSINESS MACHINES

Heinz Schmidt, Frankfurt am Main, Germany, assignor to Taylorix Organisation Stiegler, Hausser & Co., Stuttgart, Germany Filed Apr. 30, 1957, Ser. No. 655,980

Claims priority, application Germany Apr. 30, 1956

3 Claims. (Cl. 346—74)

The present invention relates to means for magnetically influencing or marking cards, sheets or similar plate-like carriers for obtaining automatic line spacing in connection with electric calculating, bookkeeping and like machines.

There are already devices or machines on the market according to which recording cards, sheets or like carriers are provided with magnetic markings, indicia or similar signs which markings serve the purpose of controlling the positioning of the cards or sheets in regard to business, accounting and like machines.

Such card systems are in use and are employed in devices with automatic line spacings for introducing or feeding, guiding and stopping the respective cards or sheets so marked during the ensuing machine operations.

For the purpose of marking such cards or sheets it was usual to resort to electromagnetic devices which are controlled and operated via electric amplifiers, whereas for scanning purposes conventional magnetic heads were used as they are conventional in magnetic tape recorders, etc., whereby the impulses are amplified and serve to regulate the machine operation. In bookkeeping machines it is, however, important that even upon interruption of the supply of electric current, working of the machine must be further reliable and continuous. The devices heretofore known do not take into consideration such facts, since the electromagnets must always depend on electric current supply of predetermined voltage. Besides this, it became necessary to arranged signalling or locking devices in such business machines which upon interruption of the electric current draw attention to the operator that further working or machine operation is interrupted, considerable importance of such occurrence being attached, in particular, to bookkeeping machines as none of the figures or numbers can be lost during recording or calculating operations.

The present invention overcomes these and other deficiencies in known machines and has as one of its objects to provide means affording continuous and efficacious machine operation without the need of electric current supply. The invention proposes the use of a permanent magnet which is displaceable relative to a magnetizable layer provided on the sheet or card to be handled. Such construction has the advantage that the machine may be employed anywhere since it is entirely independent of the electric current supply, and signalling and stopping or locking devices may thus be dispensed with.

It is another object of the invention to provide means ensuring a considerable reduction in space for accommodating the magnetic heads containing a permanent magnetic system as compared with conventional magnetic heads used in connection with magnetic tapes and like carriers. This advantage becomes considerably important for feed-in mechanisms used in typewriting, calculating, bookkeeping and like machines as such magnetic heads must very often be disposed between the sheets or cards to be fed-in whereby, however, a relatively small space will be available. Besides this, the magnetic marking devices must be arranged relatively close to the scanning means whereby the employment of permanent magnets offers other considerable advantages in construction and operation.

According to the invention the permanent magnet-containing head is shaped to contain principally a magnetic core, which is enclosed by two yoke parts between which an air gap is formed, while any free space within the interior of the permanent magnetic head is filled with a non-magnetizable filler or like material to secure the core in position. In order to be able to bring the magnet gap closer to any scanning heads used it is preferred to shape the yoke in a particular manner. To this end the yoke is composed of two plate-like covers, one of which is planar, the other being formed with a bent or curved end approaching the corresponding end of the planar cover plate and leaving an air gap therebetween.

In order to displace or slide the permanent magnet heads in a very advantageous manner a suitable guide piece is employed carrying the respective magnet heads, whereby the movement of the guide piece will be effectuated by means of a particular spring and lever system. Since the air gap of the magnetic heads must be relatively reduced in size and the same becomes extremely sensitive the magnets must be protected from excessive pressure against an abutment or support against which such heads are guided during operation. A spring system connected with the guide piece serves the purpose of regulating the pressure exerted thereby, so that damage or inaccuracies in the operation of the permanent magnet heads will be completely avoided.

In order to attain during the marking operation on a plurality of sheets a substantially uniform contact of the magnetic heads thereon, it is preferred that at the level of the permanent magnet heads there are arranged either opposite each other or at respective coordinated faces of the sheets or cards operable means preferably in the form of leaf springs, which serve as dampers and/or abutments for the magnetic heads to thereby avoid smearing or omissions of markings on said sheets or cards.

In order to provide in relatively small machines with reduced dimensions sufficient space between several sheets or cards to be marked, the magnetic heads may be so positioned and interconnected that they carry out simultaneously respective sliding movements in opposed relation to each other. If, however, sufficient space is available, then it is possible that for two or several sheets or cards to be marked the magnetic heads are inserted in and disposed on a guide piece common to all magnetic heads, so that the latter are moved in unison.

These and other advantages of the invention will become further apparent from the following detailed description, reference being made to the accompanying drawing, showing a preferred embodiment of the invention.

Figures 1, 2, 3, 4, 5:
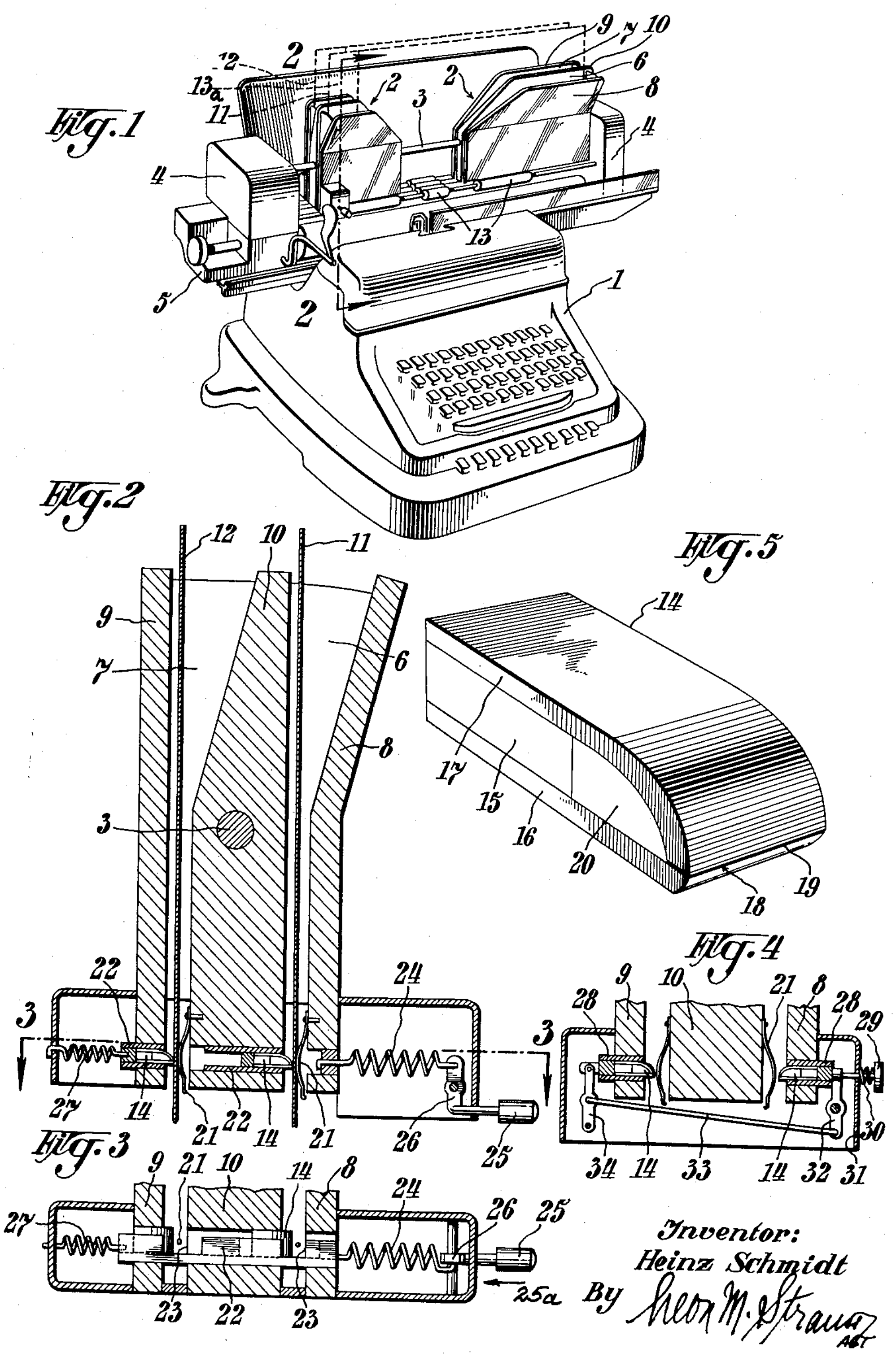
Fig. 1 is a perspective view of a bookkeeping machine equipped with a feed-in mechanism according to the invention.
Fig. 2 is an enlarged vertical sectional view taken along lines 2—2 of Fig. 1.
Fig. 3 is a horizontal sectional view taken along lines 3—3 of Fig. 2.
Fig. 4 is a detailed partial vertical sectional view similar to Fig. 2 illustrating a modified embodiment of the invention.
Fig. 5 is an illustration in perspective and on an enlarged scale of a magnetic marking head made in accordance with the invention.

Referring now in greater detail to Fig. 1 of the drawing, there is disclosed an accounting machine 1 with a feed-in mechanism 2 which is attached by means of a rod-shaped member to the housing 4 on carriage 5 of the machine. The feed-in mechanism 2 consists of two funnel-shaped devices 6, 7 successively arranged to each other, but separated from each other by a common partition wall 10. The funnel-shaped devices 6, 7 have the outer guide walls 8, 9 shaped to serve the purpose of leading cards or sheets 11 and 12 indicated in dotted lines into the interior of devices 6, 7 from where they are fed into the machine by means of transporting rollers 13. These sheets to be typed on or inscribed are correspondingly adjusted in position for the ensuing accounting performance.

In order that after the discharge of the sheet or card from the machine such sheet may be used for a later accounting performance to be carried out on the next succeeding free line, after each such accounting performance a magnetic marking is applied to the sheets 11 and 12 which carry for that purpose at one of their outermost edges a magnetizable layer 13*a* of conventional structure and composition.

To effectuate magnetization on the layer 13*a*, permanent magnet containing marking heads 14 are employed consisting each of a magnetic core 15 to which are attached at either side the yoke parts 16 and 17, which are plate-shaped and include the lower, substantially planar plate 16, whereas the upper plate 17 has a bent portion extending toward one end of said lower plate 16, so that a magnetic gap 18 is formed in which a sheet 19 made from non-magnetizable material may be inserted, whereby said sheet comes to lie for all practical purposes in the plane of the yoke plate 16. Thus it is possible to arrange the marking head 14 and in particular the gap 18 thereof as closely to any suitable object as possible. The free space 20 may be filled with any suitable, known non-magnetizable filler material, as is well understood.

The extensions of the funnel walls 8 and 9 are shaped to form supports or abutments for the sheets 11 and 12 and to this end where markings are to be provided on the sheets respective bent leaf springs 21 forming resilient abutments are disposed, which reach into the passageways of the funnel-shaped devices 6, 7. Marking heads 14 are supported adjacent and opposite the leaf springs 21 on common guide means 22, passageways or recesses 23 being provided in said guide means to facilitate passage of sheets 11 and 12 thereinto.

According to Figs. 2 and 3 the marking heads 14 may slide or may be moved by means of the aforesaid guide piece or means 22 at the level of the leaf springs 21 toward and away from the sheets 11, 12 through the intermediary of the action of a spring 24. In Figs. 2 and 3 the condition of engagement of the marking heads 14 with the sheets 11, 12 is indicated. The sliding movement of the guide piece 22 is attained by pressing button 25 inwardly according to arrow 25*a*, whereby a lever 26 expands spring 24 toward the right hand side and thus entrains guide piece 22 and marking heads 14 in the same direction.

The spring 24 is stronger than a retraction spring 27 applied to the opposite end of guide means 22, so that the action of spring 24 becomes only effective after the respective marking heads 14 abut sheets 11 and 12 and consequently come to lie opposite and against leaf springs 21. Thus in any case an excessively strong abutment movement of the marking heads 14 against the sheets 11, 12 will be prevented and any damage thereof will be avoided. Upon release of press button 25 the guide piece 22 will be released and guided back to its starting position by means of the action of the retraction spring 27.

As soon as the marking heads 14 strike against sheets 11 and 12 a magnetic marking occurs on the magnetizable layer 13*a*. This marking may then be utilized during a later feed-in operation of said sheets, via scanning means (not shown) and through known electrical amplifier system to attain accurate adjustment or adjustments of the sheet or sheets to correspond to proper line spacing.

Fig. 4 illustrates a different embodiment of the invention, wherein the magnet heads 14 are guided in separate guide pieces 28, 28*a*. The sliding movement occurs also by means of pressure against a button 29, which is springedly supported and urged by means of a spring 30 abutting against the wall 31 of the machine housing.

The movement of the button 29 will be directly transmitted upon the respective ends of the magnet heads 14, one of the magnet heads 14 being actuated by means of a lever 32 which is linked through a rod 33 with a lever 34 so that rod 33 during such transmission movement imparts opposed actions to levers 32 and 34 and thus displaces permanent magnet heads 14 accordingly in the direction of leaf spring abutments 21. The space between the respective funnels 6 and 7 can therefore be kept free for other purposes or installations.

It can thus be seen that there has been provided according to the invention a device for marking or indicating magnetic indicia on magnetizable layer equipped cards, sheets and similar plate-like carriers to thereby attain automatic line spacing for use in connection with calculating, bookkeeping and like machines, which device is provided with magnetic marking means, and means for moving said marking means into and out of contact with said magnetizable layer of said sheet, said magnetic means including a permanent magnetic capable of recording an indicia on said magnetizable layer, said permanent magnet including a magnetic core and two yoke parts covering said core, one of said yoke parts being in the form of substantially rectilinear plate, the other yoke part being positioned above and being substantially coextensive with said first-named plate, one end of said second-named plate being bent and curved toward a corresponding end of said first-named plate, to thereby obtain an air gap between said ends of said parts, the space located rearwardly of said magnetic air gap being provided with filler material substantially completely filling the space defined by said air gap and an adjacent end of said magnetic core.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A device for indicating magnetic markings on a magnetizable layer comprising a slide, magnetic marking means carried within said slide, resilient means for moving said slide and hence said marking means into and out of contact with said magnetizable layer of said sheet, said magnetic marking means including a permanent magnet capable of recording a marking on said magnetizable layer, said permanent magnet including a magnetic core and two yoke parts covering said core, one of said yoke parts being in the form of a substantially rectilinear plate, the other yoke part being positioned above said first-named plate and being substantially co-extensive with the latter, one end of said second-named plate being curved to a corresponding end of said first-named plate forming an air gap between said ends of said plates, the space located rearwardly of said magnetic air gap being provided with filler material substantially completely filling the space defined by said air gap and an adjacent end of said magnetic core, and a cushioning spring connected to said slide for preventing undue pressure being applied on said marking means.

2. A device for indicating magnetic markings on a magnetizable layer on a sheet comprising, in combination, feed-in means for supplying a sheet to be marked, a slide, magnetic marking means carried within said slide, actuation means for reciprocating said slide in a substantially linear path into and out of contact with a megnetizable layer of a sheet after same has been supplied into said feed-in means, said magnetic marking means including a permanent magnet capable of recording a marking on a magnetizable layer, resilient abutment means fixed to said feed-in means with a sheet being receivable between said magnetic marking means and said resilient abutment means, said actuation means including spring-actuated means and a pushbutton to thereby impart movement to said slide and said marking means, and a cushioning spring connected to said slide to limit pressure on said marking means.

3. A device for indicating magnetic markings on a magnetizable layer on a sheet comprising, in combination, feed-in means for supplying a sheet to be marked, a slide, magnetic marking means carried within said slide, actuation means for reciprocating said slide in a substantially linear path into and out of contact with a magnetizable layer of a sheet layer same has been supplied into said feed-in means, said magnetic marking means including a permanent magnet capable of recording a marking on a magnetizable layer, said actuation means including spring-actuated means and a pushbutton to thereby impart movement to said slide and said marking means, a cushioning spring connected to said slide to limit pressure on said marking means, means for reciprocating said slide in opposite directions and against corresponding sheets supplied by said feed-in means, and leaf spring means forming abutment means for a sheet and for said magnetic marking means when same are guided by said slide along said linear path against a sheet.

References Cited in the file of this patent

UNITED STATES PATENTS

| | | |
|---|---|---|
| 2,258,106 | Bryce | Oct. 7, 1941 |
| 2,649,950 | Endrich | Aug. 25, 1953 |
| 2,754,496 | Emery et al. | July 10, 1956 |
| 2,791,310 | Jones | May 7, 1957 |
| 2,844,434 | Beard | July 22, 1958 |